July 21, 1959

L. PALUMBO 2,895,708

FAUCET

Filed Oct. 9, 1956

INVENTOR.
LUDOVICO PALUMBO
BY
Young, Emery & Thompson
ATTYS.

United States Patent Office 2,895,708
Patented July 21, 1959

2,895,708

FAUCET

Ludovico Palumbo, Rome, Italy

Application October 9, 1956, Serial No. 614,829

Claims priority, application Italy October 14, 1955

1 Claim. (Cl. 251—77)

The invention relates to a faucet or cock suited for use in different applications. This faucet is distinguished essentially from the other known faucets by the fact that it includes the combination of a not conventional closing and opening control device preventing the wearing out of the packing means of the valve, and a not conventional elastic device hermetically protecting the working parts enabling a perfect constant lubrication of these last to be obtained.

The faucet according to the present invention is very simple and functional and has a very long life without requiring any maintenance.

This faucet may be easily and gently actuated and gradually controlled; it permits also a perfect closure without leakage of fluid at the outlet of the control device. Noisy vibrations as well as water hammerings are prevented.

The particular characteristics of the present invention and the means whereby they are attained can best be explained in connection with the accompanying drawing, which illustrates diagrammatically in an indicative manner and not limiting the invention, an embodiment of the faucet.

Figure 1:
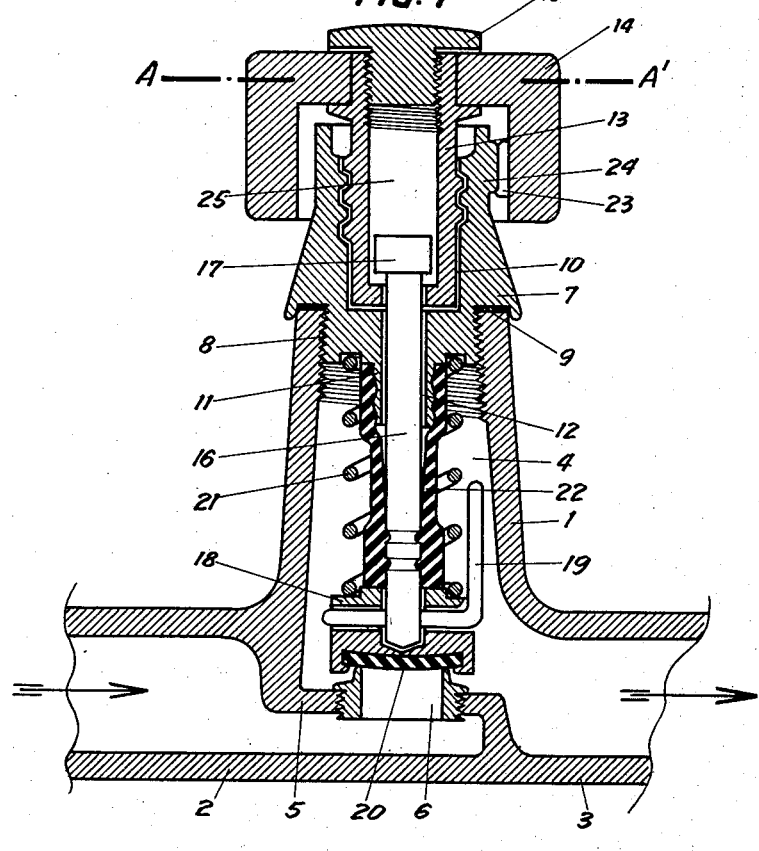
Fig. 1 is a partial longitudinal section of the faucet according to the present invention, said section being taken diametrically through the valve rod.
Figure 2:
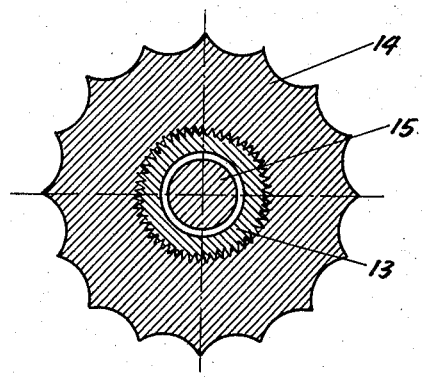
Fig. 2 is a cross section on the line A—A' of Fig. 1.

The faucet or cock according to the present invention comprises a fixed body constituted by a casing 1 of the conventional type, in which a fluid feed pipe 2 is provided as well as a delivering pipe 3 and a cone-shaped chamber 4, in which a valve device is located. The pipe 2 is separated from the chamber 4 by means of a diaphragm 5 furnished with a hole.

An interchangeable valve seat 6 may be fixed in the said hole, this seat 6 being of a corrosion resistant material.

The casing 1 may be walled in, but in any case it is intended not to be removed after its installation.

On the casing 1 is mounted a tap element 7 adapted to be screwed in the upper part 8 of the chamber 4, means being provided for securing a hermetic connection between the joined surfaces, such as, for instance, a packing ring 9.

The tap member 7, which is constituted of a hollow body, including a chamber 10, projects into the chamber 4 with a little cylindrical appendix 11, a hole 12 axially passing through the tap 7 and its projecting part 11.

The casing 1 and the tap 7, which can be disassembled, constitute the fixed part of the faucet. All the working parts are supported by the tap 7.

The internal surface of the chamber 10 is threaded: in said thread a hollow screw 13 is threaded, on which a hand grip 14 is fixed in and locked by a screw 15. The screw 13 will be suitably calculated. Also the bottom of the screw 13 is axially bored.

16 indicates a rod which passes through the hole 12 and the bottom of the screw 13, having in its upper end an enlarged part 17, which enables the rod 16 to be raised by the hollow screw 13.

At the other end of the rod 16 a valve member 18 is provided, which is secured to the said rod by means of a pin 19 with a handle bent at an angle of 90°. In the lower part of the valve 18 a fine packing disk 20 is mounted assuring the perfect closure of the valve on its seat 6. The valve 18 is so shaped that its upper part constitutes a lower seat of a corrosion resistant spring 21, the said spring 21 being mounted around the rod 16 and abutted at its other end by the lower part of the tap 7. The ends of the said spring 21 are fixed in seats which prevent rotary movements of the rod 16 when the hollow screw 13 is turning.

22 is an elastic sleeve placed around the rod 16, the upper end of which being tightened around the projecting cylindrical part 11, while the opposite one is tightened around the lower end of the rod 16.

The elastic sleeve 22 may be of synthetic rubber of the type resistant to the action of heat and of lubricating means as well as that of the substances which the fluid may contain.

The internal diameter of the elastic sleeve 22 in its central part is a little larger than the diameter of the rod 16.

The faucet or cock is so proportioned that the positions for complete closing and full opening may be reached by means of a rotation of the external control member, as for instance the hand grip 14, through an angle of less than 360°. Therefore a stop 23 is so arranged in the hand grip 14 as to encounter the stop 24, fixed on the tap 7 in correspondence to the positions for complete closing and full opening of the hand grip 14.

When the hand grip 14 is in the closed position, the hollow screw 13 reaches its lowest position and the head 17 of the rod remains distanced from the bottom of the hollow screw 13. Accordingly the spring 21 forces the valve member 18 towards its seat 6 and no fluid passes through the faucet.

The pressure of the spring 21, which will be suitably adjusted and remains always constant, secures the perfect closure without wearing out the packing disk 20.

When the hand grip 14 is operated, the hollow screw 13 also turns and the bottom of this last reaches the head 17 and causes the lifting of the rod 16 as well as of the valve member 18 counteracting the action of the spring 21.

The constant pressure of the spring 21 on the valve member 18 prevents any noisy vibration of the same valve member during the opening of the faucet.

On account of the fact that the lifting of the valve occurs in opposition to the spring action, the movement at the opening offers a gradually increasing resistance: thus the faucet is not likely to open more than necessary, while at the closing movement the resistance will be reduced and decreased so that it is very easy and rapid to intercept the fluid.

The stops provided for limiting the rotation of the hand grip 14 prevent errors and uncertainties in the movement.

If the inside diameter of the valve seat 6 is of 8 mm. a 2 mm. lifting of the valve element 18 is sufficient for a maximum water or fluid output.

The elastic sleeve 22 elongates and shortens, following the little slidings of the rod 16 and completely protects the chamber 10 of the tap 7 and separates it from the chamber 4. The possible pressure of the fluid in the chamber 4, which increases the adhesion of the sleeve 22 to the lower part of the rod 16 and to the projecting part 11 of the tap 7, combines to ensure a hermetic seal of the elastic sleeve 22. Therefore lubricating means may fill the chamber 25 inside the hollow screw and pass into the chamber 10 and into the hole 12, all the working surfaces thus being lubricated. The lubricating means will never be in contact with the fluid, thus affording a durable efficiency of said means.

The sleeve 22 has a long life even if there is a high pressure in the chamber 4, as for instance if the faucet is interposed between two pipes of a network as a closing device, or if the faucet should be so modified that the fluid reaches the chamber 4 through the pipe 3 instead of the pipe 2, which becomes thus the delivering pipe.

The pressure of the fluid may only press more or less the sleeve 22 against the lubricated rod 16 and cannot damage the sleeve 22 which is leaning in all its parts on the rod 16. The friction between the rod 16 and the sleeve 22 may only increase, but on account of the very short course of the said rod and the efficiency of the lubrication it cannot wear out the sleeve, as many tests have confirmed.

What I claim is:

A faucet comprising a body provided with an inlet, an outlet, a working chamber therebetween, a valve, a valve seat cooperating with said valve to control flow from said inlet to said outlet, a cylindrical hollow skirt fixed on the upper part of said body and depending into said working chamber, an annular indentation on the outer circumferential surface of said skirt, a valve stem passing through the bore of said skirt and carrying at its lower end said valve, a control device comprising a hollow cylinder mounted on said body with a lost-motion connection to said valve stem adapted for moving said valve stem together with said valve away from said valve seat, an annular indentation on said valve stem, a tubular elastic sleeve surrounding said skirt and the lower end of said valve stem and anchored on said indentations, a valve spring surrounding said sleeve and abutting at one end against said skirt and at the other end against said valve so as to urge said valve against said valve seat, a lubricant in said hollow cylinder in the clearance between the bore of the skirt and the valve stem and between the flexible sleeve and the valve stem, and stop means on said body and on said control device to limit the operating movement of said control device.

References Cited in the file of this patent

UNITED STATES PATENTS

| | | |
|---|---|---|
| 1,128,426 | Dunham | Feb. 16, 1915 |
| 1,228,585 | Mueller | June 5, 1917 |
| 1,541,757 | Allen | June 9, 1925 |
| 1,872,787 | Mueller | Aug. 23, 1932 |
| 2,190,723 | McBride | Feb. 20, 1940 |
| 2,264,656 | Briscoe | Dec. 2, 1941 |

FOREIGN PATENTS

| | | |
|---|---|---|
| 695,815 | France | Oct. 6, 1930 |
| 277,767 | Switzerland | of 1951 |
| 903,159 | Germany | Feb. 1, 1954 |